M. P. STONEY.
CASING FOR UNIVERSAL JOINTS.
APPLICATION FILED MAY 25, 1917.
1,247,466.
Patented Nov. 20, 1917.
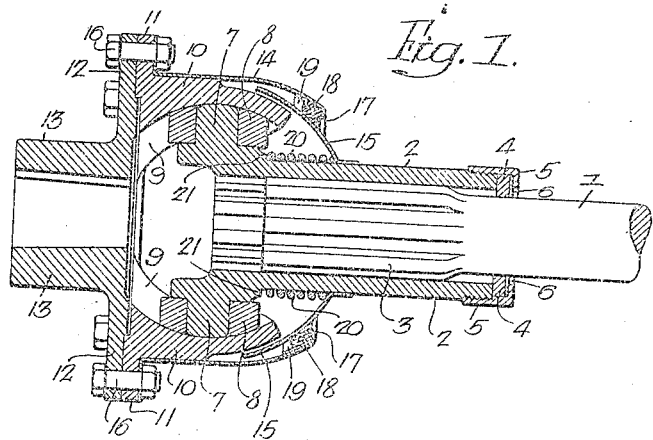
Fig. 1.
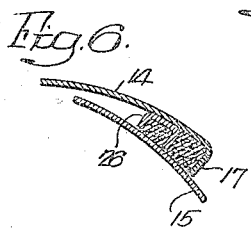
Fig. 4.
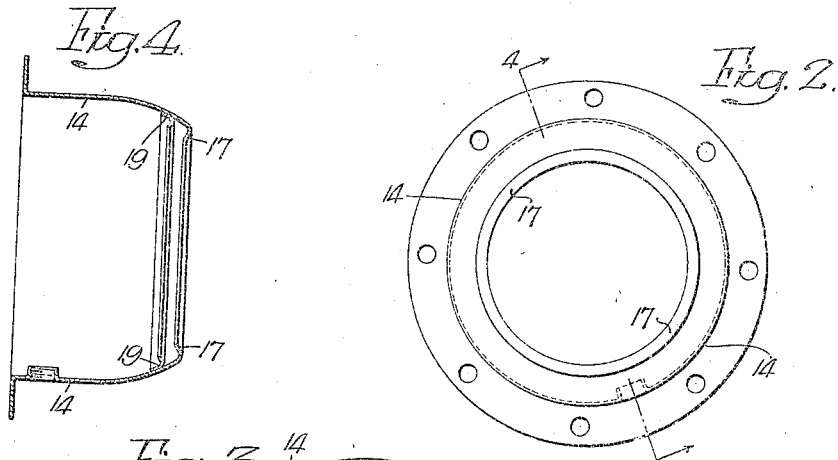
Fig. 2.
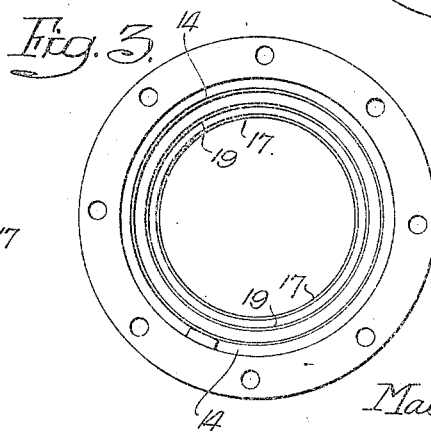
Fig. 3.
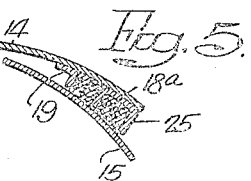
Fig. 5.
Fig. 6.
Inventor:
Malcolm P. Stoney.
by his Attorneys.
Howson & Howson

UNITED STATES PATENT OFFICE.

MALCOLM P. STONEY, OF PHILADELPHIA, PENNSYLVANIA, ASSIGNOR TO POWELL EVANS, OF PHILADELPHIA, PENNSYLVANIA.

CASING FOR UNIVERSAL JOINTS.

1,247,466.     Specification of Letters Patent.     Patented Nov. 20, 1917.

Application filed May 25, 1917. Serial No. 170,943.

*To all whom it may concern:*

Be it known that I, MALCOLM P. STONEY, a citizen of the United States, residing in Philadelphia, Pennsylvania, have invented a Casing for Universal Joints, of which the following is a specification.

One object of my invention is to provide a casing or cover for universal joints, particularly of the type described and claimed in the application for U. S. Patent of Powell Evans, Serial No. 89,613, filed April 7, 1916, which shall be of such a construction as to permit of its being made by a comparatively small number of operations and therefore at a lower cost than has hitherto been the case;—the invention contemplating such an arrangement of parts as will permit of the utilization of comparatively inexpensive grades of sheet metal.

A further object of the invention is to materially reduce the cost of the casing of a universal joint by providing a novel form of packing holding structure particularly adapted for manufacture by a few comparatively simple stamping and welding operations.

These objects and other advantageous ends I secure as hereinafter set forth, reference being had to the accompanying drawings, in which, Figure 1 is a longitudinal vertical section of a universal joint showing my invention as applied thereto;

Figs. 2 and 3 are respectively front and rear elevations of the outer casing member;

Fig. 4 is a vertical, longitudinal section on the line 4—4, Fig. 2; and

Figs. 5 and 6 are fragmentary sections showing modifications of my invention.

In the above drawings 1 represents a shaft provided at one end with elongated teeth or integral keys 3 designated to fit into correspondingly formed slots or keyways in a sleeve 2 constituting one of the members of a universal joint;—the arrangement being such that said shaft is free to move longitudinally within said sleeve. The latter at one end is provided with lubricant-retaining packing 4 held in place against the shaft 1 and the adjacent end of said sleeve by a washer 6 and an inwardly flanged shell 5 threaded to the sleeve. The opposite end of the sleeve 2 is provided with two outwardly projecting trunnions or integral pins 7, on each of which is rotatably mounted a block or slide 8 whose sides are plane and parallel. Moreover the outer surface of each slide is spherically curved to permit it to bodily move within a guideway 9 formed in the inner face of a cheek piece 10. Said two cheek pieces are preferably integral with an annular plate or flange 11 bolted to the flange 12 of a sleeve 13 designed to be connected in any suitable manner to a second shaft, (not shown). Obviously the sleeve 2 is free to swing on its trunnions 7 and the slides 8 are likewise free to move in the guides 9 about a center which is intersected by the center line of said trunnions and also by the center line of the shaft 1.

In order to exclude dust, grit, etc., from the interior of the above described universal joint, as well as to retain solid or liquid lubricating material therein, I provide a casing structure consisting of two thin metal stampings or other suitably formed members 14 and 15, of which the former is in the shape of a cylinder outwardly flanged at one end and provided with openings for the passage of the bolts 16 which clamp it to the plate 11 in addition to clamping the latter to the flange 12.

The opposite end of the casing member 10 is inwardly curved to form part of a substantially spherical surface and a limited portion of its circular edge is turned abruptly inward at an angle of substantially 90° to the adjacent part thereof. The casing member 15 is preferably made in the form of a part of a spherical shell having a central opening around which it is outwardly flanged to closely fit the cylindrical surface of the sleeve 2. This member 15 telescopes with or extends into the casing member 14 and in order to prevent the escape of lubricant between the inwardly turned edge 17 and the adjacent spherical surface of the member 15, I provide an annular body of packing 18, confined between said edge and a ring 19 of angular section. One web or flange of this ring extends substantially parallel with but spaced away from the inwardly turned edge 17, while its other member is parallel with and electrically or otherwise welded to the inner surface of the curved portion of the casing member 14.

The annular body of packing 18 projects inwardly beyond the edges of the webs or flanges 17 and 19 to make liquid tight engagement with the curved member 15 which is at all times held in contact with said packing by a coil spring 20 mounted between it and a shoulder 21 on the sleeve 2. It is to be noted that the above form of the outer casing member 14 may be inexpensively and quickly made and that of comparatively inexpensive material since a minimum number of simple operations is required to bring it to the shape illustrated and provide it with the inwardly extending edge 17. Thereafter it is merely necessary to weld or otherwise attach the angular ring 19 within said member as shown and mount the packing ring in the annular channel thus formed.

If desired, instead of bending the edge of the casing member 14 abruptly inward as indicated at 17, I may as shown in Fig. 5, leave said edge unaltered and weld or otherwise suitably fix to it a packing retaining ring 25 of U-shaped section, mounting in this an annular body of packing 18ª in such position as to make a liquid-tight joint with the second casing member 15. If it should be found advisable or necessary to employ a second body of packing in order to better retain the lubricant in the casing, I mount such a packing body between one side of the ring 25 and a ring 19 of angular section of the construction shown in Figs. 1 and 4.

Obviously the same end may be secured by providing the outer casing member 14 with an inwardly turned edge 17, as in Figs. 1 and 4, and thereafter welding or otherwise fixing to either member a second ring 26 of U-shaped section. One ring of packing may be confined between the flange or in-turned edge 17 and one side of the ring 26 and a second body of packing mounted within the channel provided by this latter ring so that both of said packing bodies engage the inner casing member.

I claim:—

1. A casing consisting of two telescoping parts of which one has a flange projecting toward the other; an annular rib fixed to said first part so as to project inwardly therefrom toward the other part and extend substantially parallel to said flange; with an annular body of packing mounted in the space between the rib and flange and engaging the second part of the casing.

2. A casing consisting of two parts of which one extends over the other and has a flange projecting toward said second part; an annular rib of angular section having one of its webs fixed to the first part and the other web projecting toward the second part substantially parallel to said flange; with packing mounted in the space between the rib and flange and engaging the second part of the casing.

3. A casing consisting of two spherically curved members of which one extends over the other and has a flange projecting toward it; a ring rigidly fixed to the inner surface of the first member and projecting toward the second member substantially parallel with the flange; with packing mounted in the annular space between said ring and the flange and slidably engaging the second member.

4. The combination of a universal joint including two relatively movable members; a casing inclosing said joint and having two parts respectively mounted on said members, one part of the casing having an inwardly extending flange and provided with an inwardly projecting rib of angular section fixed to its inner surface so as to extend substantially parallel with said flange; a body of packing confined in the space between the rib and flange, the second casing part being slidably mounted on the second of the universal joint members; and a spring acting on said second casing part to maintain it in engagement with said body of packing.

5. The combination of two casing members of which one extends within the other; the outer member having a flange; an angular rib having one of its webs welded to the inner surface of the outer member and having its other web extending substantially parallel to the flange; with packing mounted between the flange and said rib in sliding engagement with the first of the casing members.

6. The combination of two telescoping casing members of which at least one is spherically curved; packing mounted between said members within the sphere defined by said curved member; and means for holding the packing in place.

7. A casing consisting of two telescoping sections of which at least one has a substantially spherical curvature; with a packing retaining ring or rings projecting inwardly from the outer section within the sphere defined thereby; and packing held by said ring or rings between the two casing sections.

8. A casing consisting of two telescoping sections of which at least one has a substantially spherical curvature; packing between the casing sections; and means for retaining said packing in place including a ring of U-shaped section fixed to one of the casing sections.

9. A casing consisting of two telescoping sections of which at least one has a substantially spherical curvature; packing between the two casing sections, one of said sections having an inwardly projecting annular rib; and means for retaining said packing in place including a ring of U-shaped section coacting with the annular rib.

10. A casing consisting of two telescoping sections of which one has a flange projecting toward the other; with an annular ring of U-shaped section fixed to the inner surface of one of the casing sections adjacent the flange; and a plurality of rings of packing held in position by the flange and ring.

In witness whereof I affix my signature.

MALCOLM P. STONEY.